H. C. SMITH.
CULTIVATOR.
APPLICATION FILED JAN. 13, 1920.
1,342,302.
Patented June 1, 1920.
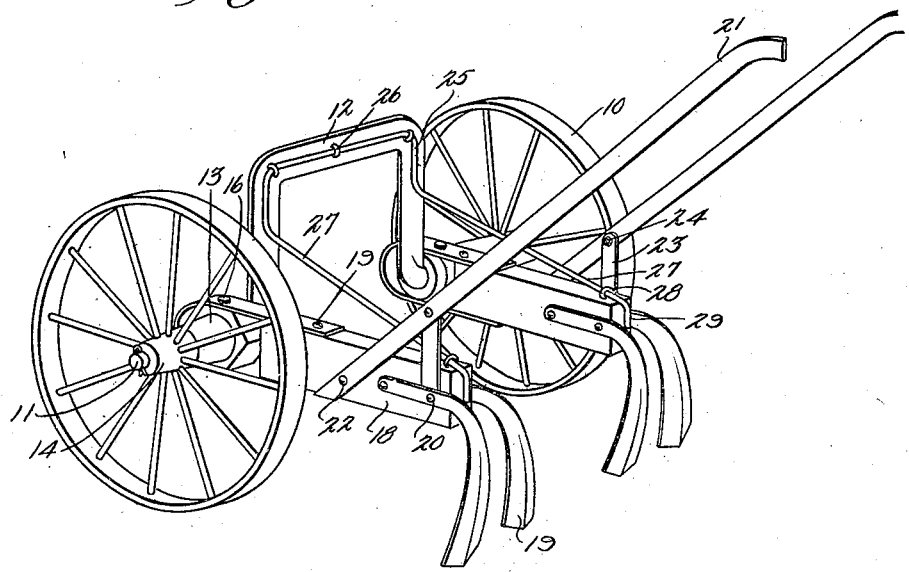
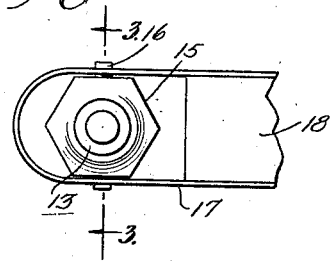
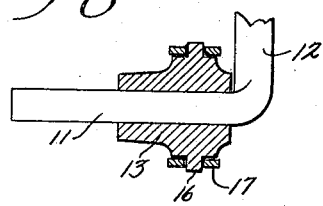
WITNESSES
INVENTOR
HENRY C. SMITH.
BY
ATTORNEYS

UNITED STATES PATENT OFFICE.

HENRY C. SMITH, OF CLINTONVILLE, CONNECTICUT, ASSIGNOR OF ONE-HALF TO ELSIE M. SMITH, OF RICHMOND HILL, NEW YORK.

CULTIVATOR.

1,342,302.  Specification of Letters Patent.  Patented June 1, 1920.

Application filed January 13, 1920. Serial No. 351,226.

*To all whom it may concern:*

Be it known that I, HENRY C. SMITH, a citizen of the United States, and a resident of Clintonville, county of New Haven, and State of Connecticut, have invented a new and Improved Cultivator, of which the following is a full, clear, and exact description.

This invention relates to cultivators, and has for an object the provision of a cultivator in which the cultivating members are resiliently held at a definite distance from the row of vegetables being cultivated, but said distance may be easily varied.

Reference is to be had to the accompanying drawing forming a part of this specification in which it is understood that the drawing is merely illustrative of one example of the invention, and in which—

Figure 1 is a perspective view of the cultivator.

Fig. 2 is a fragmentary view of the universal joint on the cultivator axle.

Fig. 3 is a section through Fig. 2 on the line 3—3.

Referring to the accompanying drawing by numerals, 10 indicates the wheels of the cultivator which are rotatably mounted on axles 11, said axles being joined together by means of an arch 12 which serves to straddle a row of vegetables as said cultivator is moved longitudinally along said row. It is specially adapted for the cultivation of growing corn when the corn has reached a considerable height. A collar 13 is rotatably mounted on each axle between the hub 14 of the wheel 10 and the arch 12. A plurality of flats 15 are formed on this collar, and to opposite flats are pivotally mounted by means of studs 16, the two legs 17 of a U-shaped strip of material. A beam 18 which is preferably made of wood is fixed between the legs 17 of the U-shaped member by means of bolts 19. Any number of plow shares 19 may be bolted to the ends of the beams 18 by means of bolts 20 and said plow shares may be steered in a regular course by means of handles 21 which are secured to said beams 18 between the axle 11 and the plow shares 19 by means of bolts 22. These handles 21 are preferably held at an angle to the beams 18 by means of braces 23 fixed to said handles by means of bolts 20 and 24.

In order to hold the arch 12 in a substantially vertical position, and to resiliently hold the beams 18 substantially parallel to each other, a spring 25 is fixed to said arch by means of eye-bolts, and has ends 27 which extend obliquely downwardly and are fixed to the ends of the beams 18 by means of eye-bolts 28. The ends 27 of the spring 25 are bent downwardly to form stops 29, said stops being designed to limit the downward rotation of one beam about the axle 11 with respect to the other beam. The ends 27 of the spring are free to slide through the eye-bolts 28 so that when it is necessary, one of the beams 18 may be raised by means of the handle 21 so as to clear a rock, stump, or other obstacle. After clearing said obstacle, the beam 18 is at once returned to its normal position by the adjacent spring end 27. The spring ends 27 will also allow the beams 18 to be rocked about the studs 16 so that they are positioned at an angle to each other in order to clear some obstacle. After said obstacle is cleared, the springs at once return the beams to their normal parallel positions.

I would state in conclusion that while the illustrated example constitutes a practical embodiment of my invention, I do not limit myself strictly to the mechanical details herein illustrated, since manifestly the same can be considerably varied without departure from the spirit of the invention as defined in the appended claim.

Having thus described my invention, I claim as new and desire to secure by Letters Patent:

In a cultivator, an arched axle, a plurality of wheels rotatably mounted on said axle, a plurality of collars rotatably mounted on said axle, a plow-carrying member pivotally mounted on each collar, and resilient means for holding said members in a normal position with respect to said arched angle and to each other, said resilient means consisting of a spring mounted on said arched axle having integral arms extending downwardly and rearwardly, said arms slidably engaging the rear ends of said plow members.

HENRY C. SMITH.